March 26, 1929. C. L. WARE 1,706,719
TEMPERATURE CONTROL SYSTEM FOR CONDENSERS
Filed Jan. 9, 1928
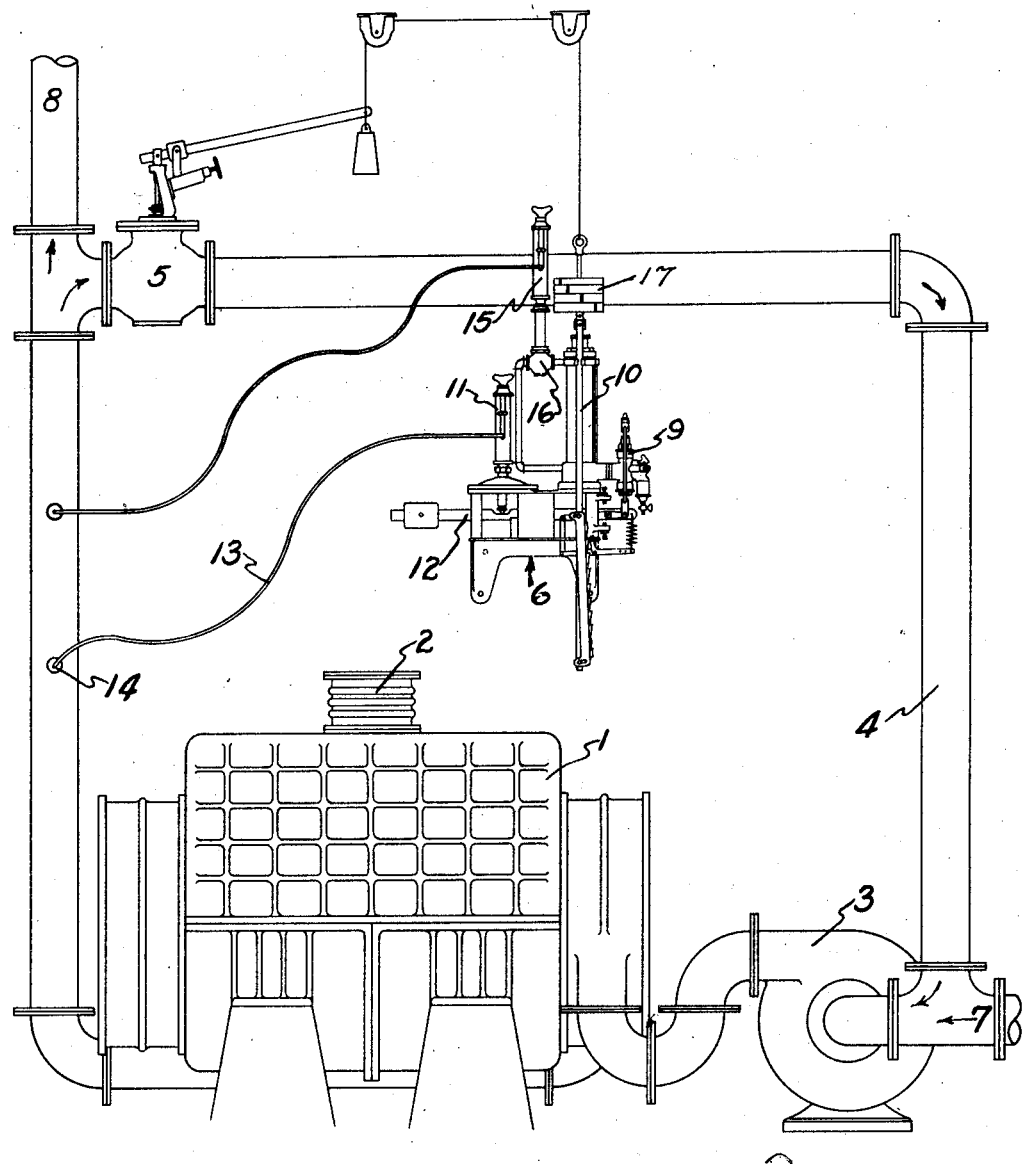
Charles L. Ware.

Patented Mar. 26, 1929.

1,706,719

UNITED STATES PATENT OFFICE.

CHARLES L. WARE, OF SHAWSHEEN VILLAGE, ANDOVER, MASSACHUSETTS.

TEMPERATURE-CONTROL SYSTEM FOR CONDENSERS.

Application filed January 9, 1928. Serial No. 245,503.

My invention relates to a temperature control system and more specifically to a recirculating system for condensers in which a uniform temperature of the cooling water discharge is automatically maintained.

In the operation of condensers, and especially those of the jet type, it is desirable to pass through them some certain quantity of water which is best suited to the given condenser and which quantity can be varied only within moderate limits without incurring difficulty from one cause or another. As a result of this, the temperature of discharge from the condensers varies with the amount of steam to be condensed and the supply temperature of the injection water. In all situations where the supply of injection water is limited, or where there may be a profitable use made of condenser discharge in process work, a dependable method of regulating the temperature of the condenser water will result in a saving of water as well as improving operating conditions and with, usually, a marked reduction in pump and condenser maintenance.

Referring to the drawing (1) represents the condenser, (2) is the flexible expansion connection which connects the condenser with a steam turbine exhaust, the turbine not being shown, (3) is the pump which supplies necessary water to the condenser, (4) is a by-pass pipe for re-circulating the discharge from the condenser to bring the final temperature up to the required predetermined value. In this by-pass connection is located a lever throttling valve (5) which by means of the temperature regulator (6) controls the amount of water to be re-circulated in accordance with the temperature setting of the regulator. The cold water enters at (7) and the discharge for use in process work is at (8). Any suitable temperature regulator can be used for the control of the by-pass re-circulating connection. The one shown having auxiliary protection against a predetermined high temperature being preferred for this purpose.

We will now explain the operation of the temperature regulator (6). This regulator is what is known as the relay or servo motor type of control. A pilot valve (9) controls the admission and exhaust of fluid pressure to a fluid pressure motor (10). The operation of the pilot valve is effected by means of a thermostatic element (11) having a motor bellows which operates lever (12) and in turn operates the pilot valve (9). A flexible tube (13) extends from the motor bellows to a bulb (14) containing an expansive fluid inserted in the condenser discharge line, variations in temperature of the condenser discharge is transmitted to the expansive fluid of the bulb, thence through the flexible tube (13) to the motor bellows which operates the lever (12) and pilot valve (9) to control the operation of the motor (10) and thereby control the position of the valve (5) to re-circulate the required amount of water to bring up the final discharge to that required for process work. If, for any reason, the temperature element above referred to should fail to control the valve (5) and the temperature of the discharge water should be re-circulated until the temperature reached a high value at which the vacuum on the turbine was likely to be affected, then the second thermostatic element, or auxiliary control (15), comes into play opening a by pass valve (16) on motor cylinder (10) and allowing the weights (17) on the plunger rod to force the plunger downward, by-passing the water from the bottom of the cylinder to the top, and thereby, closing the re-circulating valve (5).

The drawing shows the application of my invention to a surface condenser. With this type of condenser, the ordinary practice is to provide a spray pond for cooling the discharge water so it can be used over and over again for condensing purposes. With this method, the heat extracted from the steam is lost and cannot be recovered for use in process work. With my invention, no expensive spray pond is required and all condensing water as well as the heat extracted from the steam is put to a useful purpose. It is important, however, that the water be re-circulated until it reaches the highest temperature possible without affecting the condenser vacuum, and consequently the economy of the power unit. For the above reason, it is desirable to provide a safety device above referred to, in addition to the regulating thermostatic element, as a positive check against exceeding a predetermined limit of temperature, especially is this important with jet condensers as the exceeding of a predetermined limit would cause the vacuum to be broken and the power unit to operate noncondensing which also might involve a temporary shut down.

It is necessary in order to prevent sudden changes in temperature causing hunting action by the regulator, to eliminate temperature lag as far forth as possible in the system. Pressure in a system equalizes quite rapidly, but it is not so with temperature. It may be hot at one point in the system, and cold at another, and with large size pipe lines and slow velocity flow temperature lag is increased. From this it will be seen that in temperature control systems a high velocity flow is required to keep the temperature of the system equalized, otherwise the operation may be in cycles of hot and cold, with consequent hunting action of the regulator. To accomplish this, the size of re-circulating pipe (4) and the controlling valve (5) should be properly related to the size of the condenser discharge (8). The size of the by-pass (4) should be restricted in relation to the size of the discharge (8) to an extent that the amount of water which it would be possible to by-pass, would not abruptly change the temperature of the injection water. This reduction in the size of the by-pass pipe would, at the same time, cause relatively high velocity flow, all of which would materially aid in stabilizing conditions in the system and preventing overcorrection and hunting action by the regulator.

In the operation of the system, the condenser is put into service in the usual way, and the re-circulating line placed under the control of the temperature regulator. With light loads, the water will be discharged at comparatively low temperature, or a temperature below the setting of the regulator. Under such conditions, the valve (5) will be wide open and practically all water passing through the condenser being re-circulated. Then, as the temperature rises in condenser discharge to that at which the regular is set, the valve (5) will be automatically closed to the point where the temperature will remain constant. As the load on the condenser changes, the position of the valve (5) will be automatically changed, closing with an increase and opening with a decrease of load. In this way, the volume of water passing through the condenser is constant but the amount taken from the supply and discharge for use in process work varies with the load on the power unit or turbine.

I have described my invention in connection with a standard type of temperature controlling device and it should be understood that any satisfactory operating temperature controller could be used without departing from the scope of my invention. My invention, therefore, resides in means for passing through the condenser a uniform volume of water, regardless of the power load requirements, and the automatic control of the re-circulating of varying quantities of said water required to maintain a uniform discharge temperature. Incidently, such a system results in a considerable saving of water and, in plants requiring hot water for process work results in a substantial saving in steam for the heating of such water.

While I have described my invention in connection with a surface condenser used in connection with a power generating steam driven unit such as a turbine or reciprocating engine, it should be understood that I do not limit myself to the exact type of condenser as my invention is equally applicable to all types of condensers, and to condensers used for other than power purposes, I claim:

1. The method of regulating the temperature of condenser discharge water which consists in re-circulating the water discharged from said condenser until a predetermined temperature is reached and then automatically varying the amount of water to be re-circulated to maintain the discharge water at said predetermined temperature.

2. The method of regulating the temperature of condenser discharge water which consists in supplying the condenser with a uniform volume of water and re-circulating the water discharged from said condenser until a predetermined temperature is reached, and then, automatically varying the amount of water to be re-circulated to maintain the discharge water at the said predetermined temperatures.

3. The method of regulating the temperature of condenser discharge water which consists in supplying the condenser with a uniform volume of water for varying load requirements and re-circulating the water discharged from said condenser until a predetermined temperature is reached and then automatically varying the amount of water to be re-circulated to maintain the discharge water at the said predetermined temperature for all load requirements.

4. A temperature control system for condensers which comprises a condenser having an inlet connection for supplying water, an outlet connection for the discharge of said water, a by-pass connection between the discharge and inlet connections, a valve in said by-pass, a temperature regulator for automatically adjusting said valve to permit varying quantities of water to be re-circulated for the purpose of raising the discharge temperature and maintaining the same at a predetermined value.

5. A temperature control system for condensers which comprises a condenser having an inlet connection for supplying water, an outlet connection for the discharge of said water, a by-pass connection between the discharge and inlet connections, a valve in said by-pass, a temperature regulator for automatically adjusting said valve to permit varying quantities of water to be recirculated for the purpose of raising the discharge temperature and maintaining the same at a predetermined value, and temperature controlled means for positively closing said valve in case the temperature of the discharge water exceeds said predetermined value.

6. A temperature control system for condensers which comprises a pump for supplying the condenser with cooling water, a by-pass connection between the discharge of said condenser and the suction of said pump, a throttling valve in said by-pass, a temperature regulator for controlling the operation of said valve in accordance with the temperature of the discharge water, whereby varying the quantity of said discharge water which is re-circulated to maintain the condenser water at a uniform temperature.

7. A temperature control system for condensers which comprises a pump for supplying the condenser with water, a by-pass connection between the discharge of said condenser and the suction of said pump, a throttling valve in said by-pass, a temperature regulator for controlling the operation of said valve to re-circulate a portion of said water to maintain the discharge at a predetermined temperature, and auxiliary temperature controlled means to close said valve in case said temperature reaches a predetermined higher value than that at which said regulator is adjusted.

CHARLES L. WARE.